Patented June 13, 1944

2,351,094

UNITED STATES PATENT OFFICE 2,351,094

CHROMIUM OXIDE CATALYST

David G. Blaker, Webb City, Okla., assignor to Phillips Petroleum Company, a corporation of Delaware No Drawing. Application November 12, 1940, Serial No. 365,369

12 Claims. (Cl. 252—232)

This invention relates to improvements in chromium oxide catalysts and more particularly to improvements in catalysts comprising unglowed chromium oxide. It relates also to the treatment of hydrocarbons in the presence of chromium oxide catalysts.

Catalysts comprising unglowed chromium oxide are useful for treating hydrocarbons. For example, they may be used to effect the conversion of hydrocarbons by changing the carbon-to-hydrogen ratios thereof at elevated temperatures. The change in the carbon-to-hydrogen ratios may be effected by dehydrogenation, as, for example, in the dehydrogenation of paraffin hydrocarbons to the corresponding mono-olefins, in the dehydrogenation of paraffins or mono-olefins to the corresponding di-olefins, or in the dehydrogenation of paraffins or cycloparaffins to form aromatics; or the change may be effected by hydrogenation, as, for example, in the hydrogenation of di-isobutylene to iso-octane and in the hydrogenation of unsaturated polymer-gasoline into motor fuel of less-unsaturated characteristics, and the like. In certain instances, such changes in the carbon-to-hydrogen ratio may be accompanied to some extent by isomerization-type reactions such as those involved in the reforming and/or cyclization of some hydrocarbons boiling in the motor-fuel range, such as conversion of hexane to benzene, etc. Destructive conversion of organic sulfur compounds found in some natural hydrocarbon materials may also be effected in the presence of such catalysts.

A chromium oxide gel catalyst suitable for effecting changes in the carbon-to-hydrogen ratios of hydrocarbons has been described in U. S. Patent 1,905,383 and in an article by Frey and Huppke published in Industrial and Engineering Chemistry, Vol. 25, January, 1933, pp. 54–59. U. S. Patents 2,098,959 (Re. 21,911) and 2,098,960 (Re. 21,932) disclose that it is sometimes desirable to incorporate or commingle homogeneously with the chromium oxide one or more difficultly fusible and difficultly reducible oxides, such as an oxide of aluminum, zirconium, thorium, silicon, magnesium, titanium, or boron, and the like, in such a way that the gel characteristics are conserved; heavy metal oxides, such as those of thallium, bismuth, lead, and mercury, may also in certain cases contribute desirable qualities to the gel catalyst.

In the preparation of these gel catalysts, which contain dark or black unglowed chromium oxide, a solution containing a chromic salt is used, and a gel comprising dark green hydrous chromium oxide is formed by precipitation with an alkali solution, such as a solution of ammonia, sodium hydroxide, potassium hydroxide, etc. In many cases, as has been disclosed in the copending application of Morey, Serial No. 113,091, filed November 27, 1936, now Patent 2,288,320, issued June 30, 1942; it is advantageous to precipitate the hydrous gel from a solution in which the chromium is to a substantial extent in the form of colloidally dispersed chromic oxide instead of solely in the form of a dissolved chromic salt. The hydrous gel is suitably washed and dried; the resulting homogeneous oxide mixture is broken into granules of a suitable size, and it is suitably reduced before use as a catalyst. A somewhat similar catalyst prepared by impregnating and coating certain porous and pervious supports with hydrous gelatinous chromium oxide is disclosed in Morey's application Serial No. 359,295, filed October 1, 1940.

The copending application of Matuszak and Morey, Serial No. 173,708, filed November 9, 1937, now Patent 2,294,414, issued September 1, 1942, discloses that catalysts containing unglowed chromium oxide and capable of catalytically converting hydrocarbons by changing their carbon-to-hydrogen ratios at elevated temperatures may be prepared also by subjecting an ammonium-containing salt of chromic acid, such as a complex metallo-ammonium chromate or, in the simplest case, crystalline ammonium dichromate or ammonium chromate, to a controlled and nonspontaneous thermal decomposition, whereby a dark porous granular material is obtained that can be used as a catalyst directly without being briquetted or compressed into pellets. This material is suitably reduced before use as a catalyst. As disclosed by Matuszak and Morey, the granules or crystals of such an ammonium-containing salt of chromic acid shrink during said decomposition and the total chromium oxide of the residue has an approximate empirical formula of $CrO_2$, although it apears that the composition is better expressed by the formula $Cr_2O_3.CrO_3$, which has the same ratio of chromium to oxygen. The latter formula implies that two-thirds of the chromium is trivalent and that one-third is hexavalent. The presence of chromium having a valence greater than three is readily observable by dissolving a portion of the catalyst in hot dilute sulfuric acid, cooling, and adding potassium iodide whereupon iodine is liberated, the amount of which may be readily and accurately determined. Under the same conditions trivalent chromium does not cause any liberation of iodine.

Because of its convenience and because it is determinable by such a method, reference is made to the chromium of higher valence than three, which is present in the residue from the nonspontaneous thermal decomposition of an ammonium-containing salt of chromic acid, as being hexavalent.

As disclosed in the copending application of Morey and Frey, Serial No. 173,709, filed November 9, 1937, which has issued as Patent No. 2,312,572, it is advantageous to control the conditions of preparation in such a manner that the catalytic material immediately prior to the reducing step contains unglowed chromium oxide in which chromium with a valence greater than three, but probably less than six, is present to an extent equivalent to a hexavalent chromium content of from 1 to 40 per cent of the total chromium. The desired content of higher-valent chromium in gel-type catalytic materials is obtained preferably by an incomplete drying of the hydrous gel in an oxidizing atmosphere, such as air; the drying is done advantageously at a temperature gradually increasing from about room temperature to a temperature that does not exceed about 400° F., suitably to a final temperature of about 300° F. The desired content of higher-valent chromium in catalytic materials prepared by nonspontaneous thermal decomposition of ammonium salts of chromic acid is obtained by continuing the nonspontaneous thermal decomposition until the content of higher-valent chromium decreases to a value below about 40 per cent of the total chromium, preferably to a value between 30 and 33 per cent; the nonspontaneous thermal decomposition must be made at a temperature below about 440° F., and it is made advantageously in a temperature range between about 350 and 400° F.

The last-mentioned copending application of Morey and Frey (Patent No. 2,312,572) also discloses that it is advantageous to conduct the reducing step in the preparation of a catalyst comprising unglowed chromium oxide under conditions so controlled that the temperature of the chromium oxide rises sufficiently slowly within the range of about 300 to 570° F. in order that reduction of chromium with a valence greater than three is effected without thermal decomposition of the chromium oxide having chromium with a valence greater than three, or at least without decomposition of more than a negligible proportion thereof. Simultaneously, if the catalytic material is a gel, the gel is dried beyond the state attained in the preceding incomplete drying in an oxidizing atmosphere. Still further drying is effected by a raising of the temperature, after the reduction is complete, beyond 570° F.; the drying is substantially complete if the temperature is raised to a value within the range preferred for the dehydrogenation of hydrocarbons, namely, about 750 to 1100° F. Other desirable catalysts comprising partially oxidized and reduced dark unglowed chromium oxide incorporated together with certain hereinbefore mentioned oxides on porous, pervious supports have been disclosed in the application of Morey and Frey, Serial No. 359,296, filed October 1, 1940.

When a catalyst containing unglowed chromium oxide is used for the conversion of hydrocarbons by changing the carbon-to-hydrogen ratios thereof, it is maintained at an elevated temperature, generally within the range of from 390 to 1100° F. The lower half of this range is generally most useful in the hydrogenation of unsaturated hydrocarbons, the intermediate region for desulfurization of hydrocarbon fractions, and the upper half in the dehydrogenation of hydrocarbons. Apparently because of the elevated temperature, which appears to promote a deposition of carbonaceous matter on the catalyst, the catalyst gradually becomes deactivated during any such use. To counterbalance the influence of the deactivation, either the temperature of the catalyst or the time of contact of the reactants with the catalyst, or both, must be increased; and eventually the catalyst becomes so deactivated that it no longer effects a profitable degree of conversion but must be revivified by a procedure that removes the carbonaceous deposit, as by burning it off with air at an elevated temperature. After being revivified, the catalyst has a restored activity and can be used again; the sequence of use and revivification can be repeated many times.

An object of my invention is to provide improved catalysts comprising unglowed chromium oxide.

Another object of my invention is to provide a process for the preparation of chromium oxide catalysts that have a reduced tendency to become deactivated when used at elevated temperatures for the treatment of hydrocarbons, as for the conversion of hydrocarbons by changing the carbon-to-hydrogen ratios thereof.

A further object of my invention is to provide a process for the catalytic treatment of hydrocarbons at elevated temperatures in the presence of improved chromium oxide catalysts.

Other objects and advantages of my invention will be recognized by those skilled in the art.

I have found that the tendency of catalysts comprising unglowed chromium oxide to become deactivated during use for the treatment or conversion of hydrocarbons is decreased markedly by subjecting the catalyst to the action of an aqueous solution of at least one alkaline compound.

Although so far as I know all more or less soluble alkaline compounds are effective to some degree, I have found that the improvement effected by alkaline compounds that leave a nonvolatile residue upon being heated to an elevated temperature is generally more consistent and uniform than that effected by volatile alkaline compounds. Furthermore, I have found that although all soluble alkaline compounds of alkali and alkaline-earth metals are effective to some extent, a superior degree of improvement is effected by the action of the hydroxides of alkali metals. A particularly good and uniform improvement appears to result from the use of potassium hydroxide, but any other alkali-metal hydroxide, such as sodium or lithium hydroxide, also produces good improvement.

Ammonia and substituted ammonias or amines may be cited as examples of volatile alkaline compounds. Hydroxides of alkali and alkaline-earth metals, and alkaline salts—especially alkali-metal salts of weak inorganic acids, such as boric and silicic acids; alkali-metal salts of amphoteric hydroxides, such as aluminum and zinc hydroxides; and alkali-metal salts of organic acids, such as carbonic and acetic acids—may be cited as examples of alkaline compounds that leave a nonvolatile residue upon being heated to an elevated temperature and that are suitable to various degrees for use in my process.

Acidic or neutral compounds such as the salts of alkali metals with strong acids—such as hydrochloric alkali-metal salts of nitric, sulfuric, and like acids—are of no particular advantage in so far as my invention is concerned; in fact, treatment with solutions of such acidic or neutral compounds appears to exert a deleterious effect, apparently by promoting a subsequent tendency for the unglowed chromium oxide to change, with glowing, at elevated temperatures to the undesired common green sesquioxide. However, the presence of a limited amount of normally acidic or neutral compounds in the treating solution can be tolerated, provided that the solution is definitely alkaline.

Although the reason for the improvement effected by my process is not completely clear, it appears to be due partly to a leaching of the catalyst by the alkaline solution and partly to a concomitant adsorption of a nonvolatile and alkaline material by the catalyst. Leaching with distilled water is relatively ineffective. During the treatment the alkaline solution becomes more or less yellow, as if hexavalent chromium were removed; apparently chromium having a valence greater than three but less than six, such as tetravalent chromium, is not removed, provided that the catalyst was previously dried to the extent that it does not disintegrate excessively on contact with water. Catalysts containing dark unglowed chromium oxide possess a high adsorptive capacity and adsorb considerable dissolved material that can not be readily removed by rinsing or brief washing with water. Such adsorbed material apparently exerts a beneficial modifying effect upon the catalytic properties of the catalyst, probably by preferentially covering or otherwise affecting catalytic points or areas that have a relatively high carbonizing tendency. Nonvolatile compounds appear to be superior to volatile compounds for modifying the catalytic surface.

Although the treatment of the catalyst with the alkaline solution may be effected in various other ways, the preferred method comprises soaking a mass of granules of the catalyst in the alkaline solution at room temperature for a period sufficient for the aforementioned leaching and adsorption effects to take place. The concentration of the solution, the ratio of the volume of the solution to the volume of the catalyst, and the duration of the soaking may be varied over wide ranges. A concentration range of from 0.5 to 5 per cent by weight is preferred, but concentrations outside of this range can be used and should not be excluded from the scope of my invention except as specified in the appended claims. However, the alkali concentration should not be so great nor the treating conditions so rigorous that any extensive decomposition or dissolution by the alkaline solution of the desired chromium oxide, or other desirable constituents of the catalyst, take place. The ratio of the volume of the solution to the volume of the catalyst is preferably from 1 to 50, but it may be outside of this range without passing beyond the limits of my invention. The duration of the soaking may vary from a few minutes to several days; I prefer a duration between one hour and two days. The amount of nonvolatile residue associated with the treated catalyst should be between about 0.2 and 10 per cent of the chromium oxide, with the optimum range generally between about 1 and 5 per cent.

If desired, limited agitation may be used during the soaking, but it is not necessary; excessive agitation should be avoided, as it may cause undesired disintegration of the catalyst granules. If desired, the alkaline solution may be flowed through a bed of the catalyst, but this procedure has no marked advantage over the preferred procedure of simple soaking, except as it may be more convenient in some cases.

After the soaking treatment is complete, the catalyst is removed from the solution, is rinsed with water to remove adhering solution, is dried, and may be sieved to a suitable size; it is then ready for use for the treatment of hydrocarbons. Prolonged washing of the treated material during the rinsing step should be avoided.

I have found that the advantages of the soaking treatment are obtained most consistently and uniformly if the method of preparation of the catalyst is such that a catalyst is substantially free of any nonvolatile alkaline ingredient before treatment in accordance with my invention. Hence, in the preparation of gel catalysts containing unglowed chromium oxide by precipitation of dark green hydrous chromium oxide, I prefer to use ammonia or other volatile base as the alkaline precipitant. However, catalysts that are prepared by the use of a nonvolatile precipitant, such as one or more hydroxides of the alkali metals, and that contain mere traces of such nonvolatile precipitant, not removable by washing, are not to be excluded from the scope of my invention, except as specified in the appended claims, inasmuch as the treatment is generally advantageous for these catalysts, although to a lower degree of uniformity than that obtained for catalysts entirely devoid of nonvolatile alkaline ingredients.

Although the benefits of the preferred way of practicing my invention are obtainable to some degree if the soaking treatment is applied at early stages in the preparation of a chromium oxide gel catalyst, such as at the stage in which the catalyst material is in the form of a gelatinous precipitate, or at the stage in which the catalytic material is in the form of an unreduced and incompletely dried gel, such as a gel dried in air at temperatures below about 400° F., the benefits are obtained most advantageously and to the highest degrees of efficacy and of reproducibility if the soaking treatment is applied to catalysts that are dried thoroughly, as for example, catalysts that have been heated in a reducing atmosphere to temperatures above about 570° F. and that are ready for use for the treatment of hydrocarbons as practiced heretofore in the prior art. Applying the soaking treatment to the catalytic material in the form of a gelatinous precipitate is objectionable in that, because the gelatinous precipitate possesses an extraordinarily large adsorptive capacity, an excessive amount of the alkaline compound may be incorporated in the catalytic material, and in that, because the alkaline compound becomes incorporated throughout the ultimate catalyst instead of merely in and near the surface of the catalyst, a deleterious effect upon the gel structure of the catalyst appears to be produced. Applying the soaking treatment to the catalytic material in the form of an unreduced and incompletely dried gel is objectionable in that the granules of the gel become disrupted into fine particles, which must be briquetted after the treatment if they are to be used most satisfactorily for the catalytic treatment of hydrocarbons; the briquetting entails an additional expense that is avoided if the gel is thoroughly dried before the soaking treatment. However, in cases in which it is desired to use a briquetted catalyst, treatment of an incompletely dried gel may be an advantageous method of applying my invention.

The following examples are given purely for the purpose of illustrating some of the many possible methods of practicing my invention; they are not necessarily to be taken as establishing limitations of the invention. For the sake of brevity only, they are limited to chromium oxide gels and to the use of the dehydrogenation of isobutane for exemplification of the effectiveness of catalysts prepared according to the invention.

*Example I*

A portion of the granular chromium oxide gel, which had been precipitated from chromic nitrate solution by ammonia, dried in air, and reduced and dehydrated in hydrogen at temperatures increasing gradually to about 840° F., was soaked for two days in about fifty times its own volume of a 1.25 per cent solution of sodium hydroxide. Then it was removed from the solution, washed with distilled water, dried, and heated in hydrogen to a temperature of 842° F. Then isobutane was passed through the catalyst bed at atmospheric pressure and at a space velocity of 2000 volumes of isobutane, calculated to 32° F. and 1 atmosphere, per volume of catalyst per hour. The temperature of the catalyst was so controlled automatically that the conversion to isobutylene was maintained substantially constant at 17 per cent; thus, during the run, the temperature gradually increased to compensate for the gradual deactivation of the catalyst. When the temperature reached 1020° F., the run was stopped. The run lasted for 50 hours.

Another portion of the same batch of catalyst, which was not given the treatment with the sodium hydroxide solution, gave a run, under the same conditions, of only 20 hours.

Thus the treatment with sodium hydroxide so reduced the tendency of the catalyst to become deactivated that the catalyst effected conversion of isobutane to isobutylene for a period two and a half times as long as that characteristic of the catalyst before treatment.

The treated and the untreated portions of catalyst, after use in the aforementioned runs, were revivified by a current of air at an elevated temperature. They then were used again for the dehydrogenation of isobutane under the foregoing conditions; the lengths of the runs were identical with those obtained previously, illustrating that the effect of the treatment with the alkaline solution is permanent and is not lost during revivification. Repeated use and revivification do not diminish the beneficial effect produced in a catalyst by my treatment.

*Example II*

A portion of a granular gel catalyst consisting uniformly of chromium oxide that, during reduction by hydrogen at an elevated temperature, had become converted in part into green chromium sesquioxide was soaked for two days in about fifty times its own volume of a 1.25 per cent solution of sodium hydroxide. It was freed from excess adhering solution by a rinsing with water, dried, and used for the dehydrogenation of isobutane under the conditons specified in Example I. The run lasted for 22.5 hours. Another portion of the same batch of catalyst, which was not treated with the sodium hydroxide solution, gave a run of only 3 hours. Thus the treatment with the sodium hydroxide solution so improved the catalyst that it effected dehydrogenation of isobutane for a period seven and a half times as long as that characteristic of the catalyst before the treatment.

This example illustrates the high degree of improvement obtained when the treatment with an alkaline solution is applied to a catalyst, previously untreated, that has become damaged, during its preparation or during use or revivification, by an incomplete transformation of black chromium oxide to green chromium sesquioxide, which is relatively inactive for changing the carbon-to-hydrogen ratios of hydrocarbons.

*Example III*

Portions of a batch of granular chromium oxide gel, which had been dried in air and then reduced in hydrogen diluted with nitrogen, were soaked for two days in solutions having about fifty times the volume of the catalyst and containing sodium hydroxide of the concentrations given in the following tabulation. The portions then were rinsed with water, dried, and used for the dehydrogenation of isobutane under the conditions described in Example I. The lengths of the runs, up to a final temperature of 1020° F., are given in the tabulation; the length of run obtained with an untreated portion of the same batch of catalyst is included.

| Strength of solution | Conversion at 17 per cent |
| --- | --- |
| *Per cent* | *Hours* |
| None | 18 |
| 0.75 | 40 |
| 1.25 | 45 |
| 2.00 | 53 |
| 3.75 | 52 |
| 6.25 | 50 |

Each portion of the catalyst was improved greatly by the treatment. The degree of improvement appeared to increase rather rapidly with increase in the strength of the solution up to two per cent; then it appeared to decrease relatively slowly with further increase in the strength. The maximum length of run obtained was practically three times as long as that characteristic of the untreated catalyst.

*Example IV*

Green chromium nitrate was dissolved in hot water, and ammonium hydroxide was added until the solution was basic to litmus. The resulting dark green precipitate of hydrous chromium oxide was washed twice with hot water by decantation and then filtered. The filter cake was dried in air at 120° F. for seven days at 250 to 300° F. for one day. The material was then broken into granules of about 10 to 20 mesh in size, and the granules were separated from smaller particles. A portion of the resulting granular chromium oxide gel was reduced with hydrogen at a temperature that was increased gradually from room temperature to 930° F. It then was soaked for two days in fifty times its own volume of a 2.0 per cent solution of sodium hydroxide. After being rinsed free of adhering solution and dried, it was used for the dehydrogenation of isobutane under the condition specified in Example I; it gave a run of 37 hours. A portion of the same batch of reduced gel, which was not treated with sodium hydroxide solution, gave a run of only 18 hours. The treatment with sodium hydroxide solution so improved the catalyst that its length of run after the dehydrogenation of isobutane was doubled.

Example V

Portions of a batch of granular chromium oxide gel, which had been dried in air and then reduced with hydrogen at an elevated temperature, were soaked in sodium hydroxide solutions of the volumes, relative to the volume of catalyst, and the concentrations given in the following tabulation, for the periods indicated. They then were rinsed free of adhering solution, dried, and used for the dehydrogenation of isobutane at atmospheric pressure, at a space velocity of 2000 volumes of isobutane (NTP) per volume of catalyst per hour, and under temperature conditions so controlled automatically that the conversion to isobutylene was maintained substantially constant at 25 per cent. The lengths of the various runs, including a run made with an untreated portion of the same batch of catalyst, each up to a final temperature of 1020° F., are given in the tabulation.

| Treating solution | | Treating period | Conversion at 25% |
|---|---|---|---|
| Relative volume | Concentration | | |
| | Per cent | Hours | Hours |
| None | -------- | -------- | 5 |
| 50 | 0.75 | 0.08 | 11 |
| 50 | 0.75 | 3 | 11 |
| 50 | 0.75 | 24 | 12 |
| 50 | 0.75 | 48 | 12 |
| 250 | 0.15 | 48 | 11 |

These data show that the treatment under the various conditions indicated so modified the catalyst that its running life was somewhat more than doubled. The constancy of the improvement obtained indicates that the relative volume of the treating solution, the concentration of the treating solution, and the duration or period of the treatment can be varied widely.

Example VI

A portion of the batch of reduced granular chromium oxide gel of Example V was soaked for two days in fifty volumes of a solution of borax kept saturated by an excess of solid borax. The solution became pale yellow. The catalyst then was rinsed free of adhering solution, dried, and used for the dehydrogenation of isobutane under the conditions described for Example V. The length of the run was 8 hours, which is a period longer by 3 hours or by 60 per cent than that of 5 hours, characteristic of the untreated catalyst.

Example VII

A portion of the batch of reduced granular chromium oxide gel of Example V was soaked for two days in fifty volumes of a solution of strontium hydroxide kept saturated by an excess of solid strontium hydroxide. The solution became pale yellow. The catalyst then was rinsed free of adhering solution, dried, and used for the dehydrogenation of isobutane under the conditions described for Example V. The length of the run was 7 hours, which is a period longer by 2 hours or by 40 per cent than that of 5 hours, characteristic of the untreated catalyst.

Example VIII

A portion of the batch of reduced granular chromium oxide gel of Example V was soaked for two days in fifty volumes of a 2.8 per cent solution of potassium hydroxide. The solution became quite yellow. The catalyst then was washed free of adhering solution, dried, and used for the dehydrogenation of isobutane under the conditions described for Example V. The length of the run was 20 hours, which is a period longer by 15 hours or by 300 per cent than that of 5 hours, characteristic of the untreated catalyst. A portion treated similarly but with a 2.5 per cent solution of potassium hydroxide and another portion treated with a 3.0 per cent solution each gave runs of 18 hours.

Example IX

A portion of the batch of reduced granular chromium oxide gel of Example V was soaked for two days in fifty volumes of a 4.0 per cent solution of sodium aluminate. The solution became yellow. The catalyst then was washed free of adhering solution, dried, and used for the dehydrogenation of isobutane under the conditions described for Example V. The length of the run was 11 hours, which is a period longer by 6 hours or by 120 per cent than that of 5 hours, characteristic of the untreated catalyst.

Example X

Another series of runs was made to determine the amount of adsorbed alkaline material, and its effect upon the activity of the catalyst. In preparing the catalyst, hydrous chromium oxide was precipitated from a boiling solution of chromium nitrate by the addition of ammonium hydroxide. The precipitate was washed twice with boiling water and filtered as dry as possible. The resultant filter cake was divided into 5 equal portions and each was treated with 40 volumes of a sodium hydroxide solution for 48 hours. Each solution was then filtered off and analyzed for residual sodium hydroxide, from the results of which the adsorbed sodium hydroxide was determined. The treated hydrous chromium oxide was dried in air at 122° F. for a week, and heated to 930° F. in a reducing atmosphere. The resultant catalyst was then used to dehydrogenate isobutane under constant conversion conditions similar to those previously described. These data are given in the accompanying table.

| Strength of solution | NaOH adsorbed on treated catalyst | Conversion at 25 per cent |
|---|---|---|
| Weight per cent | Per cent | Hours |
| 0.006 | 0.22 | 6.5 |
| 0.025 | 0.95 | 10 |
| 0.062 | 2.41 | 10 |
| 0.125 | 4.67 | 8 |
| 0.250 | 8.68 | 10 |

Although the adsorption of 0.22 per cent of sodium hydroxide on this catalyst resulted in somewhat improved performance, for example, as compared with the untreated catalyst of Example V, about 1 per cent was necessary to give an extensive improvement. Increased amounts of adsorbed alkali up to nearly 9 per cent neither increased nor decreased the improvement markedly in this particular case.

The foregoing examples illustrate the improvement effected in catalysts containing unglowed chromium oxide by treatment with a solution of an alkaline compound. I have found that the improvement is relatively smaller than those indicated by the foregoing examples if the catalysts have been previously subjected to temperatures within the range of 1020 to 1470° F. in accordance with the disclosure of the aforementioned copending application of Morey and Frey, Serial No. 173,709, filed November 9, 1937 (Patent No. 2,312,572). In other words, the improvements effected by the treatment with an alkaline solution and by the exposure to temperatures above about 1020° F., in so far as the length of a period of use for the conversion of hydrocarbons is concerned, are not fully additive. A relative advantage of the treatment with an alkaline solution is that it is carried out at ordinary temperatures and not at elevated temperatures.

In the interests of simplicity and brevity and for the sake of facilitating comparisons, I have limited the specific examples given herein to a particular use of the improved catalysts, namely, to the dehydrogenation of isobutane. My invention, however, is not to be limited to this use, for the improved catalysts are similarly effective for promoting other reactions, such as the dehydrogenation of paraffin hydrocarbons in general to the corresponding olefins, especially the dehydrogenation of paraffin hydrocarbons having two to twenty carbon atoms per molecule, the dehydrogenation of olefins to diolefins, the aromatization of motor-fuel hydrocarbons by dehydrogenation, the hydrogenation of olefins to paraffins, and the like. The improved catalysts are also highly effective in reactions other than those in which the carbon-to-hydrogen ratios of hydrocarbons is changed, as, for example, in the isomerization and/or cyclization of certain motor-fuel hydrocarbons and in the desulfurization of a petroleum fraction in the vapor phase at elevated temperatures. Such reactions may be effected under various conditions, such as pressures below or about atmospheric, in the presence or in the absence of hydrogen, etc. Moreover, my invention is not to be limited to chromium oxide gels, as it is applicable to all catalysts comprising unglowed chromium oxide, such as gels containing oxides other than chromium oxide; carriers like alumina, bauxite, charcoal, silica, etc., impregnated with chromium oxide; catalysts formed by nonspontaneous thermal decomposition of ammonium-containing salts of chromic acid; and the like.

My invention includes the process of improving catalysts that is disclosed herein and the improved catalysts, and the use of such catalysts for the treatment of hydrocarbons.

Many materials and conditions other than those specifically mentioned herein are comprised in many modifications of my invention that will be obvious to those skilled in the art. Therefore, my invention is not to be limited unduly by the foregoing specification and examples but is to be understood to be extensive in scope and equivalents, within the scope of the appended claims.

I claim:

1. A process for modifying the catalytic properties of a catalyst comprising substantially dried and reduced unglowed chromium oxide, which comprises subjecting said catalyst to the action of an aqueous solution of a water-soluble alkaline compound of a metal selected from the group consisting of alkali and alkaline-earth metals, and thereafter drying said catalyst.

2. A process for modifying the catalytic properties of a catalyst comprising unglowed chromium oxide that has been changed in part from the dark unglowed form to the green glowed form, which comprises subjecting said catalyst to the action of an aqueous solution of a water-soluble alkaline compound of a metal selected from the group consisting of alkali and alkaline-earth metals.

3. A process for modifying the catalytic properties of a catalyst comprising substantially dried and reduced unglowed chromium oxide, which comprises subjecting said catalyst to the action of an aqueous solution comprising potassium hydroxide of such concentration and for such period that from approximately 0.2 to approximately 10 per cent by weight of potassium compound, based on the weight of chromium oxide in the catalyst, is associated with the catalyst.

4. A process for modifying the catalytic properties of a catalyst comprising substantially dried and reduced unglowed chromium oxide, which comprises subjecting said catalyst to the action of an aqueous solution comprising sodium hydroxide of such concentration and for such period that from approximately 0.2 to approximately 10 per cent by weight of sodium compound, based on the weight of chromium oxide in the catalyst, is associated with the catalyst.

5. A process for modifying the catalytic properties of a catalyst comprising substantially dried and reduced unglowed chromium oxide, which comprises subjecting said catalyst to the action of an aqueous solution comprising sodium aluminate of such concentration and for such period that from approximately 0.2 to approximately 10 per cent by weight of sodium compound, based on the weight of chromium oxide in the catalyst, is associated with the catalyst.

6. A catalyst consisting of unglowed chromium oxide and containing from approximately 0.2 to approximately 10 per cent by weight of a compound of a metal selected from the group consisting of alkali and alkaline-earth metals resulting from subjecting said catalyst to the action of an aqueous solution comprising a water-soluble alkaline compound of the metal.

7. A catalyst consisting of unglowed chromium oxide and containing from approximately 0.2 to approximately 10 per cent by weight of a potassium compound resulting from subjecting said catalyst to the action of an aqueous solution comprising potassium hydroxide.

8. A catalyst consisting of unglowed chromium oxide and containing from approximately 0.2 to approximately 10 per cent by weight of a sodium compound resulting from subjecting said catalyst to the action of an aqueous solution comprising sodium hydroxide.

9. A catalyst consisting of unglowed chromium oxide and containing from approximately 0.2 to approximately 10 per cent by weight of a sodium compound resulting from subjecting said catalyst to the action of an aqueous solution comprising sodium aluminate.

10. A process for modifying the catalytic properties of a catalyst comprising substantially dried and reduced unglowed chromium oxide, which comprises subjecting said catalyst to the action of an aqueous solution of a water-soluble alkaline compound of a metal selected from the group consisting of alkali and alkaline-earth metals of such concentration and for such period that from approximately 1 to approximately 5 per cent by weight of the alkaline metal compound, based on the weight of chromium oxide in the catalyst, is associated with the catalyst.

11. A process for modifying the catalytic properties of a catalyst consisting of dried and reduced unglowed chromium oxide, which comprises subjecting said catalyst to the action of an aqueous solution of a water-soluble alkaline compound of a metal selected from the group consisting of alkali and alkaline-earth metals.

12. A catalyst consisting of unglowed chromium oxide and containing from approximately 1 to approximately 5 per cent by weight of a compound of a metal selected from the group consisting of alkali and alkaline-earth metals resulting from subjecting said catalyst to the action of an aqueous solution comprising a water-soluble alkaline compound of the metal.

DAVID G. BLAKER.